United States Patent
Scorgie

(10) Patent No.: US 9,873,963 B2
(45) Date of Patent: Jan. 23, 2018

(54) SPACER MESH MAT BASE

(71) Applicant: MindsInSync Inc., New York, NY (US)

(72) Inventor: Iain Scorgie, New York, NY (US)

(73) Assignee: MINDSINSYNC INC., New York, NY (US)

( * ) Notice: Subject to any disclaimer, the term of this patent is extended or adjusted under 35 U.S.C. 154(b) by 0 days.

(21) Appl. No.: 14/216,974

(22) Filed: Mar. 17, 2014

(65) Prior Publication Data

US 2015/0257567 A1     Sep. 17, 2015

(51) Int. Cl.

| | | |
|---|---|---|
| B32B 5/22 | (2006.01) | |
| B32B 5/26 | (2006.01) | |
| A47G 27/02 | (2006.01) | |
| D04B 21/16 | (2006.01) | |
| B32B 5/02 | (2006.01) | |
| B32B 5/24 | (2006.01) | |

(52) U.S. Cl.
CPC ......... *D04B 21/16* (2013.01); *A47G 27/0206* (2013.01); *B32B 5/026* (2013.01); *B32B 5/028* (2013.01); *B32B 5/245* (2013.01); *B32B 5/26* (2013.01); *B32B 2255/02* (2013.01); *B32B 2255/26* (2013.01); *B32B 2262/0276* (2013.01); *B32B 2266/0278* (2013.01); *B32B 2266/06* (2013.01); *B32B 2471/04* (2013.01); *D10B 2403/0112* (2013.01); *D10B 2403/0221* (2013.01); *Y10T 428/24612* (2015.01)

(58) Field of Classification Search
CPC ............ A47G 27/0212; A47G 27/0218; A47G 27/0225; A47G 27/0231; A47G 27/0237; A47G 27/0206; B32B 5/026; B32B 5/028; B32B 5/245; B32B 5/26; B32B 2471/04; B32B 2255/02; B32B 2255/26; B32B 2262/0276; B32B 3/26; D04B 21/16; D10B 2403/0112; D10B 2403/0221; Y10T 428/24612; Y10T 428/24

USPC ........... 428/95, 119, 172, 304.4; 5/420, 652, 5/652.1, 653; 442/311, 315

See application file for complete search history.

(56) References Cited

U.S. PATENT DOCUMENTS

| | | |
|---|---|---|
| 3,681,130 A | 8/1972 | Hagley |
| 4,777,681 A | 10/1988 | Luck et al. |
| 5,010,610 A | 4/1991 | Ackley |

(Continued)

FOREIGN PATENT DOCUMENTS

| | | |
|---|---|---|
| CN | 2105914 | 6/1992 |
| CN | 1254248 | 5/2000 |

(Continued)

OTHER PUBLICATIONS

Australian Examination Report corresponding to Australian Patent Application No. 2012100007 dated Apr. 20, 2012 (4 pages).

(Continued)

*Primary Examiner* — Joanna Pleszczynska
(74) *Attorney, Agent, or Firm* — Pillsbury Winthrop Shaw Pittman LLP

(57) ABSTRACT

A mat includes a base portion having a spacer mesh fabric. The mat includes a cover, an optional filler material and a base. The cover may be any type of fabric and/or carpet material and the filler may be a foam or other cushioning material. The spacer mesh base includes a plurality of sets of lands and grooves.

14 Claims, 3 Drawing Sheets

(56) References Cited

U.S. PATENT DOCUMENTS

| | | | |
|---|---|---|---|
| 5,063,253 A | 11/1991 | Gansen et al. | |
| 5,204,155 A | 4/1993 | Bell et al. | |
| 5,420,170 A | 5/1995 | Lutter et al. | |
| 5,491,851 A | 2/1996 | Alonso | |
| 5,599,617 A | 2/1997 | Ewald | |
| 5,652,038 A | 7/1997 | Geren | |
| 5,733,629 A | 3/1998 | Insley | |
| 5,851,457 A | 12/1998 | Peterson et al. | |
| 6,065,164 A | 5/2000 | Swanger et al. | |
| 6,223,362 B1 | 5/2001 | Liang | |
| 6,751,816 B1 | 6/2004 | Wechsler | |
| 6,774,067 B2 | 8/2004 | Demott et al. | |
| 6,794,316 B1 * | 9/2004 | Buscher | A47G 27/0231 442/2 |
| 6,845,781 B1 | 2/2005 | Matsuda et al. | |
| 6,895,619 B1 | 5/2005 | Lee | |
| 7,137,157 B2 | 11/2006 | Nichols | |
| 7,235,504 B2 * | 6/2007 | Shirasaki | A47C 31/006 442/304 |
| 7,275,793 B2 * | 10/2007 | Fujita | A47C 31/006 297/452.27 |
| 7,461,894 B2 | 12/2008 | Leeds | |
| 7,867,599 B1 | 1/2011 | Willingham | |
| 8,298,644 B2 * | 10/2012 | Booth | B60N 3/042 428/68 |
| 8,347,435 B2 | 1/2013 | Yu | |
| 8,461,065 B2 * | 6/2013 | Ming-Shun | D04B 21/12 442/304 |
| 2001/0044249 A1 | 11/2001 | Demott et al. | |
| 2002/0045021 A1 | 4/2002 | Brown et al. | |
| 2002/0187300 A1 | 12/2002 | Nakasuji | |
| 2003/0092336 A1 | 5/2003 | Castro et al. | |
| 2003/0203164 A1 | 10/2003 | Healy | |
| 2004/0235382 A1 | 11/2004 | Groten et al. | |
| 2005/0031827 A1 | 2/2005 | Lang et al. | |
| 2005/0112320 A1 | 5/2005 | Wright | |
| 2005/0118907 A1 | 6/2005 | Lang et al. | |
| 2005/0224000 A1 | 10/2005 | Holte | |
| 2006/0037143 A1 | 2/2006 | Green | |
| 2006/0282953 A1 | 12/2006 | Telegadis et al. | |
| 2007/0074349 A1 | 4/2007 | Green | |
| 2007/0157355 A1 | 7/2007 | Katsin | |
| 2007/0275827 A1 | 11/2007 | Glaser | |
| 2008/0040850 A1 | 2/2008 | Moots | |
| 2008/0152860 A1 | 6/2008 | Meyer | |
| 2008/0235892 A1 | 10/2008 | Williams | |
| 2008/0293318 A1 | 11/2008 | Scorgie | |
| 2009/0155520 A1 | 6/2009 | Roers et al. | |
| 2010/0143640 A1 | 6/2010 | Wilmsen | |
| 2010/0143645 A1 | 6/2010 | Wilmsen | |
| 2010/0192305 A1 | 8/2010 | Telegradis et al. | |
| 2010/0200625 A1 | 8/2010 | Gaum | |
| 2010/0209661 A1 | 8/2010 | Wilmsen | |
| 2010/0297423 A1 | 11/2010 | Chapman et al. | |
| 2011/0252567 A1 | 10/2011 | Yu | |
| 2012/0124740 A1 | 5/2012 | Castle | |
| 2012/0208416 A1 | 8/2012 | Lerman | |
| 2012/0227181 A1 | 9/2012 | Cintas et al. | |
| 2013/0065043 A1 | 3/2013 | Teran | |
| 2013/0227855 A1 | 9/2013 | Wilmsen | |

FOREIGN PATENT DOCUMENTS

| | | |
|---|---|---|
| CN | 2579281 | 10/2003 |
| CN | 2650661 | 10/2004 |
| CN | 2815194 | 9/2006 |
| CN | 2831968 | 11/2006 |
| CN | 2930514 | 8/2007 |
| CN | 201171582 | 12/2008 |
| CN | 201360887 | 12/2009 |
| CN | 202234647 U | 5/2012 |
| DE | 202005019828 U1 | 3/2006 |
| DE | 102010011355 A1 | 7/2011 |
| DE | 202010017758 U1 | 9/2012 |
| EP | 433878 A | 6/1991 |
| EP | 0572104 A1 | 1/1993 |
| EP | 1473706 | 11/2004 |
| EP | 1826303 A1 | 8/2007 |
| GB | 1204128 A | 9/1970 |
| GB | 2138012 A | 10/1984 |
| JP | 2000-189290 A | 7/2000 |
| JP | 2000-262358 A | 9/2000 |
| KR | 686627 B1 | 2/2007 |
| KR | 2008001091 U | 5/2008 |
| KR | 2011008733 U | 9/2011 |
| KR | 2012068438 A | 6/2012 |
| WO | 03/087458 A1 | 10/2003 |
| WO | 2012170872 A2 | 12/2012 |

OTHER PUBLICATIONS

Packaging material for memory responsive foam filled bath mat dated Feb. 21, 2008 (2 pages).
Product sheet for memory foam bath mat by Ultimate Products, undated (1 page).
International Preliminary Report dated Mar. 7, 2013 in corresponding International Patent Application No. PCT/US10/46046.
International Search Report and Written Opinion issued in corresponding international for PCT/US2010/059105 dated Feb. 28, 2011.
Great Britain Search Report corresponding to International Application No. GB1020627.4 dated Feb. 24, 2011 (2 pages).
International Search Report and Written Opinion corresponding to International Application No. PCT/US10/046046 dated May 6, 2011 (11 pages).
International Preliminary Search Report and Written Opinion corresponding to International Application No. PCT/US2010/059105 dated Jun. 5, 2012 (11 pages).
Chinese Search Report and Written Opinion corresponding to Patent No. ZL2010206089942 dated Aug. 22, 2011.
Third party concise description of relevance regarding U.S. Appl. No. 13/462,304 submitted Feb. 20, 2013.

* cited by examiner

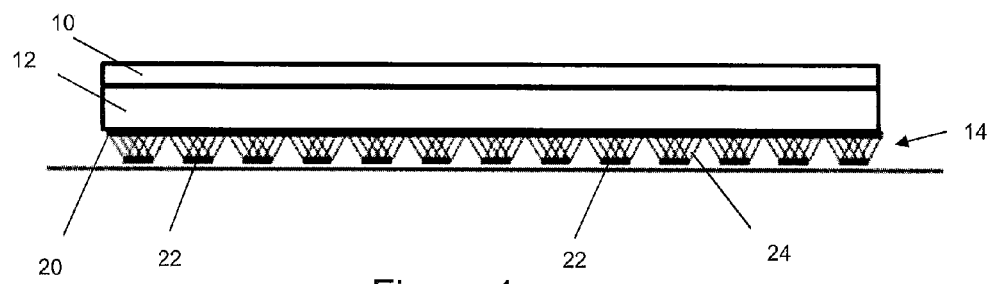
Figure 1
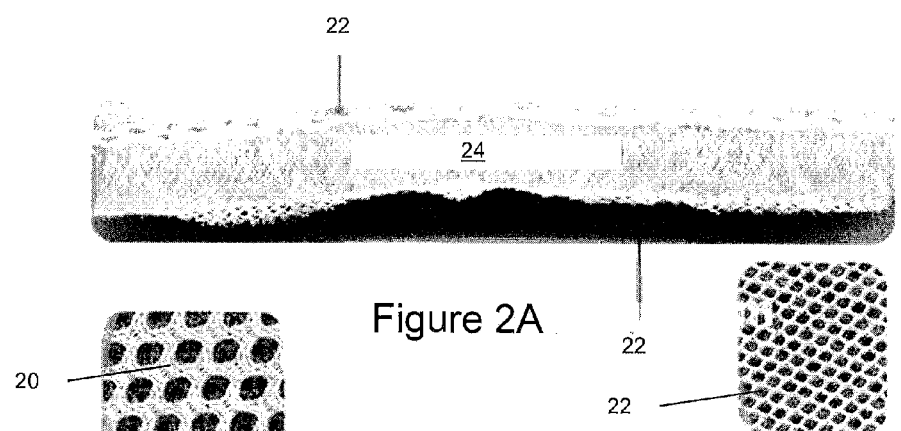
Figure 2A
Figure 2B
Figure 2C

SPACER MESH MAT BASE

FIELD OF THE INVENTION

The invention relates generally to mats for use in home environments and more particularly to mats incorporating spacer mesh material.

BACKGROUND OF THE INVENTION

Spacer mesh is a knitted fabric material that may be used to separate layers of a textile product. An example of a three dimensional spacer mesh is shown in Chinese Utility Model CN203174270, herein incorporated by reference in its entirety.

BRIEF DESCRIPTION OF THE DRAWINGS

FIG. 1 schematically shows a mat in accordance with an embodiment;

FIG. 2A shows a cross sectional view of a base portion of the mat of FIG. 1,

FIG. 2B shows a top plan view and FIG. 2C shows a bottom plan view of the base of FIG. 2A;

DETAILED DESCRIPTION

Figure 3A:
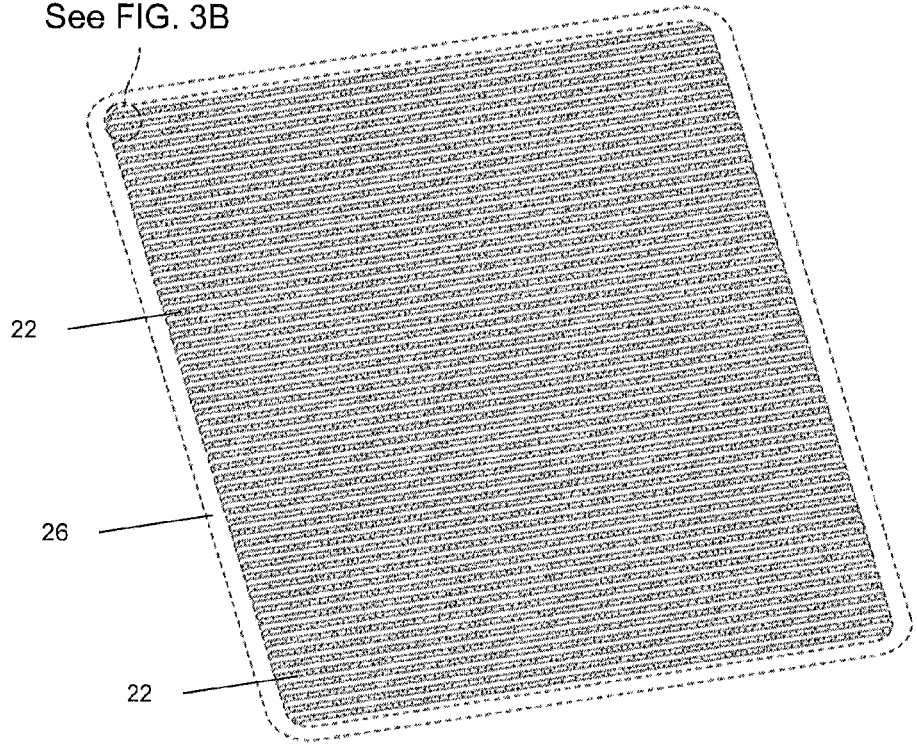
FIG. 3A is an isometric view of a mat in accordance with an embodiment.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

A mat in accordance with an embodiment is schematically illustrated in FIG. 1 and includes a cover 10, an optional filler material 12 and a base 14. The cover 10 may include any type of carpeting, including woven, needlefelt, tufted and knitted, and may have a pile. Materials may include polypropylene, polyamide, polyester, nylon, cotton, wool, acrylic and combinations thereof. The yarn may be draw textured and/or fully drawn yarn, according to the selected use for the final product. In an embodiment, the material may be a microfiber material which may be, for example, a material including from 60-90% polyester by weight with the remainder polyamide. In a selected embodiment, the material may be 75%-85% polyester and 15 to 25% polyamide and in a specific embodiment, the material may be 80% polyester and 20% polyimide. Filler materials may include batting or padding, foam, memory foam, or other cushioning materials as known in the art. The filler material may be from 1 cm to 5 cm thick, and in the memory foam embodiment, may include a viscoelastic open cell polyurethane having a density of between 2.6 and 3 lbs/ft$^3$ and in a specific embodiment, of approximately 2.8 lbs/ft$^3$.

Layers may be glued together, or, when suitable, flame-bonded. In certain embodiments, stitching may be used to secure the layers, either alone or in combination with glue and/or flame-bonding.

The base 14 is a three-dimensional spacer mesh which is itself made up of a top surface 20, a plurality of bottom surfaces 22, and a core 24. In an embodiment, the core 24 comprises a single extruded polyester monofilament composed that is knit together with the top 20 and bottom surfaces 22, which may also be formed by knitting. As will be appreciated, in principle the core need not be formed from a single filament, but may, depending on the knitting process, include multiple such filaments. The bottom surfaces 22 are separated by channels 26 forming a series of lands and grooves.

FIG. 2A shows the base 14 in greater detail, while FIG. 2B shows the top 20 and FIG. 2C shows the bottom 22. Note that the "eyes" of the top and bottom fabric are of differing sizes in the illustrated embodiment. The eye size may be selected in accordance with the specific desired end product.

The mat may include an optional border 26, around the outer edge of the base. Typically, this border will be made from the same material as the cover and/or be a continuation/fold of the cover material. In an alternate approach, the border may be an additional piece such as piping or the like. The border may be glued or sewn as desired.

The polyester monofilament is sufficiently strong to act as a support, separating the top surface from the bottom surface, and maintaining an air gap therebetween. The monofilament is knitted in a less dense pattern such that fluid may flow through gaps in the core layer. In particular, both air and water can freely flow though the core such that a mat having a base in accordance with an embodiment will tend to allow water to flow out from the mat, discouraging it from becoming waterlogged, and further, will tend to allow air to flow, encouraging drying of a wet mat.

The characteristics of the monofilament fiber may be selected to optimize different aspects, such as strength, resilience, durability, and/or cost. Typically, thicker monofilament will provide for greater supporting force. The characteristics of the core act, in addition to the fluid characteristics described above, to provide a selected amount of cushioning, providing a comfortable support to a person standing or walking on the mat.

Figure 3B:
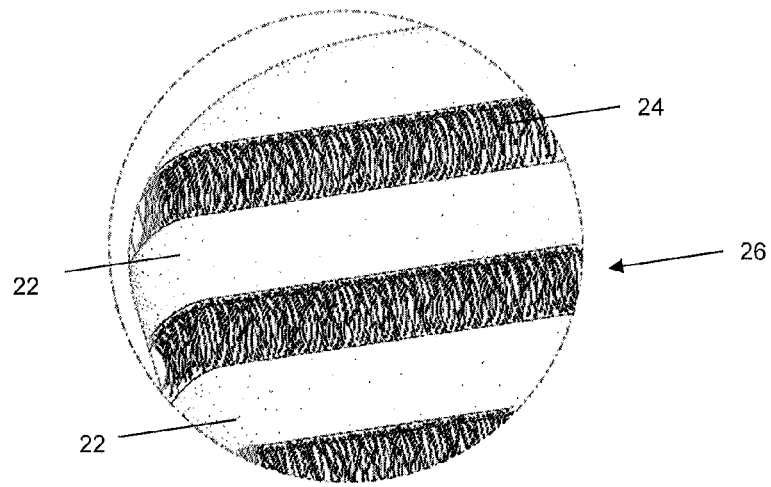
FIG. 3B is a detail view of a portion of the mat of FIG. 3A.

As shown in FIGS. 3A and 3B, the core 24, and the monofilament which comprises it, is visible in the channels 26 between each adjacent pair of bottom surfaces 22.

In a particular embodiment, a yarn thickness of between 0.08 and 0.16 mm and more particularly between 0.10 and 0.14 mm. In a specific embodiment, the yarn thickness is 0.12 mm. In an embodiment, the bottom surfaces 22 include a slip-reducing surface which may be, for example, a latex and/or styrene-butadiene rubber (SBR) coating. For stronger, more resilient embodiments, thicker yarns may be used, including 0.15 mm, 0.16 mm, 0.18 mm, 0.25 mm, or 0.30 mm yarn.

The thickness of the three-dimensional layer 14 may be, for example, between about 4 mm and about 20 mm, though certain embodiments may make use of a thinner sandwich having a thickness between about 2 mm and about 4 mm The configuration of strips and grooves may be formed during the knitting process by selection of the parameters for the knitting. In particular, the skilled artisan understands that the yarn feeder is adjustable to control the yarn knit according to a particular design selection. Likewise, the size of the eyes, as shown in FIGS. 2A and 2B is adjustable by adjusting the knitting machine. As shown in FIG. 1, the strips and grooves may simply alternate and have similar widths. Likewise, either the strips or the grooves may be relatively larger than the other. For example, the strips may be half the width of the grooves or twice the width of the grooves. As will be appreciated, other ratios may be selected.

In an embodiment, the base may be made in accordance with a method including, obtaining selected yarns, warping the yarns to a pan head of a knitting machine, knitting the yarns to obtain a knitted fabric, heat setting the raw (griege) fabric at a temperature selected to obtain a size stable fabric, optionally dying the fabric, washing and drying, and finally, heat setting the fabric again. In the stabilizing step, the selected heat may be, for example, in a range between about 180 C and 200 C, and more particularly, about 190 C.

In a specific embodiment, the base fabric has a base fabric weight of 450 g±30 g/m$^2$, a thickness of 6 mm±0.5 mm, a rib width of 6 mm±0.5 mm, a stripe to space duty cycle of 33.3%/66.6%, a fully drawn top yarn of 300 D/96 F, a monofilament diameter of 0.12 mm, and a bottom yarn similar to the top yarn. In an alternate embodiment, the base fabric is thinner and has a base fabric weight of 230 g±10 g/m$^2$, a thickness of 3 mm, a rib width of 3 mm, a stripe to space duty cycle of 50%/50%, a fully drawn top yarn of 100 D/48 F, a monofilament diameter of 0.12 mm, and a bottom yarn of 75 D/48 F. As will be appreciated, the top and bottom yarns may be selected to vary in accordance with the desired final fabric weight and stiffness.

Figure 4:
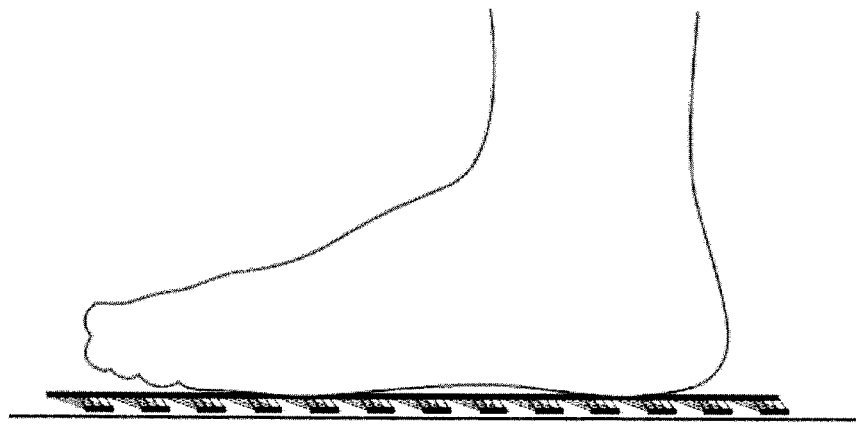
FIG. 4 shows an embodiment illustrating a leaning issue as described below; and, FIG. 5A shows a bottom plan view of a lean-resistant embodiment.
Figure 5A:
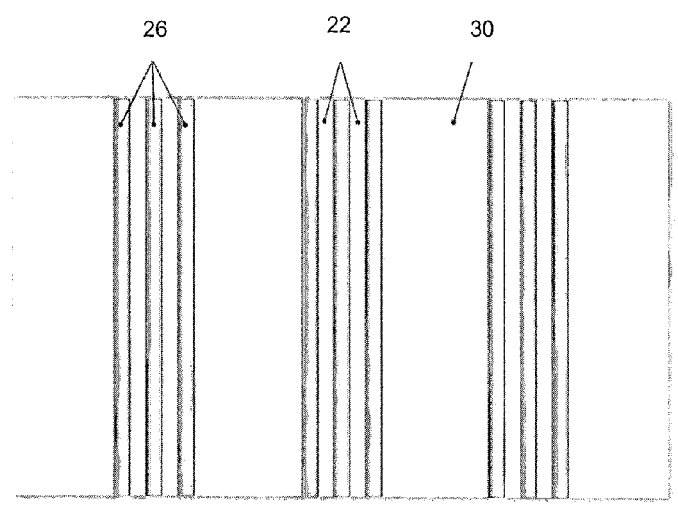
FIG. 5B shows a cross sectional view of the embodiment of FIG. 5A.
Figure 5B:
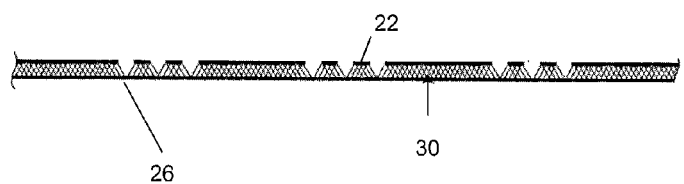

In certain cases, it is possible that the strips of spacer mesh material may be susceptible to "leaning" when the mat is stepped on, as shown in FIG. 4. While this is not believed to be hazardous, it may feel disconcerting or otherwise undesirable to a person stepping on a mat so configured. In this case, it may be useful to include a combination of narrow bottom surfaces 22 and wide bottom surfaces 30 to help offset the leaning phenomenon while providing sufficient channels/grooves 26 for funneling water away. In this alternate embodiment the base profile alternates a pair of narrow strips with a wider strip, as shown in FIGS. 5A and 5B. In this approach, the wide strips provide greater stability to help reduce "collapsing", while the narrow strips provide channels for water to flow.

The skilled artisan will appreciate that configurations other than that illustrated may be used, such as varying the number of strips and their width and depth. It is also appreciated that the mixture of wide and narrow strips can be irregular. Likewise, though the embodiment shown involves several separated base segments, a channel may be used that does not separate all regions of the base. For example, a single channel in an s-shape or a zig-zag shape could provide an appropriate flow path for water without separating the base into unconnected regions.

In each of the foregoing embodiments, a coating may be applied to the bottom surfaces to increase the coefficient of friction between the bottom surfaces and the floor in both dry and wet environments. This coating may be applied by spraying or by other known methods.

The foregoing illustrated embodiments are provided to illustrate the structural and functional principles of embodiments of the present invention and are not intended to be limiting. To the contrary, the principles of the present invention are intended to encompass any and all changes, alterations and/or substitutions within the spirit and scope of the following claims. Where approximate measurements are provided, the skilled artisan will appreciate that typically variations of approximately plus or minus 10% will, in general, provide similar functionality.

I claim:

1. A mat, comprising:
a base layer including a top surface and a bottom surface, the top and bottom surfaces being separated by a spacer mesh core and wherein the bottom surface and core each include a plurality of corresponding and coextensive channels, each channel extending from a first edge of the base layer to a second edge of the base layer;
a fabric cover layer, secured to the base; and
a slip-resistant coating on the bottom surface,
wherein the spacer mesh core comprises a polyester monofilament knit to the top surface and the bottom surface and wherein the top surface and the bottom surface comprise knit fabrics and the channels are formed by the process of knitting the polyester monofilament to the bottom surface, wherein the bottom surface comprises a plurality of ground-engaging surfaces extending from the first edge of the base layer to the second edge of the base layer and separated from each other by the channels, and a plurality of filaments of the polyester monofilament are knit together to each of the plurality of ground-engaging surfaces.

2. A mat, comprising:
a base including a top surface and a bottom surface, the top and bottom surfaces being separated by a spacer mesh core and wherein the bottom surface and core each include at least one channel, wherein the bottom surface includes a plurality of ground-engaging surfaces and a plurality of channels between pairs of adjacent ground-engaging surfaces, each channel extending from a first edge of the base to a second edge of the base, and the core includes a plurality of corresponding channels, each corresponding core channel being coextensive with a corresponding bottom surface channel extending from the first edge of the base to the second edge of the base and wherein the spacer mesh core comprises a plurality of polyester monofilaments, and wherein a plurality of polyester monofilaments are knit to each of the ground-engaging surfaces.

3. A mat as in claim 2, wherein the plurality of ground-engaging surfaces and channels comprise a repeating pattern of ground-engaging surfaces and channels.

4. A mat as in claim 2, wherein the spacer mesh core comprises a monofilament knit together with the top and bottom surfaces.

5. A mat as in claim 4, wherein the monofilament has a thickness between about 0.10 mm and about 0.30 mm.

6. A mat as in claim 5, wherein the monofilament has a thickness between about 0.10 mm and about 0.14 mm.

7. A mat as in claim 4, wherein the monofilament, top and bottom surfaces are heat set after being knit together to stabilize a separation between the top and bottom surfaces.

8. A mat as in claim 2, further comprising a fabric cover layer, secured to the base.

9. A mat as in claim 8, wherein the fabric cover layer is directly secured to the base.

10. A mat as in claim 8, further comprising a cushioning layer between the fabric cover layer and the base.

11. A mat as in claim 8, wherein the bottom surface further comprises a slip-resistant coating.

12. A mat as in claim 11, wherein the slip-resistant coating comprises a rubber material.

13. A mat as in claim 11, wherein the slip-resistant coating comprises a material selected from the group consisting of: latex, rubber, SBR and combinations thereof.

14. A mat as in claim 3, wherein the pattern of ground-engaging surfaces comprises a first ground-engaging surface having a first width and a second ground-engaging surface having a second width, wider than the first width, separated by a channel.

\* \* \* \* \*